| United States Patent [19] | [11] Patent Number: 4,510,031 |
|---|---|
| Matsumura et al. | [45] Date of Patent: Apr. 9, 1985 |

[54] HEAT-FOAMABLE OLEFINIC RESIN COMPOSITION AND PROCESS FOR PRODUCTION OF OLEFINIC RESIN FOAM FROM SAID COMPOSITION

[75] Inventors: Michio Matsumura, Saitama; Takao Inoue, Ageo; Toshihiro Arai, Hasuda, all of Japan

[73] Assignee: Sekisui Kagaku Kogyo Kabushiki Kaisha, Osaka, Japan

[21] Appl. No.: 604,315

[22] Filed: Apr. 25, 1984

[51] Int. Cl.³ .............................................. C08J 9/10
[52] U.S. Cl. .............................. 204/159.20; 521/95; 521/96; 521/134; 521/140; 521/915; 525/240
[58] Field of Search ................. 204/159.20; 521/134, 521/95, 96, 140, 915; 525/240

[56] References Cited

U.S. PATENT DOCUMENTS

| 4,212,787 | 7/1980 | Matsuda et al. | 521/134 |
| 4,313,873 | 2/1982 | Lim | 521/134 |
| 4,379,859 | 4/1983 | Hirosawa et al. | 521/134 |
| 4,421,867 | 12/1983 | Nojiri et al. | 521/134 |
| 4,440,899 | 4/1984 | Peerlkamp | 525/240 |

*Primary Examiner*—Morton Foelak
*Attorney, Agent, or Firm*—Wenderoth, Lind & Ponack

[57] ABSTRACT

A heat-foamable olefinic resin composition comprising
(a) an ethylenic polymer,
(b) a propylene/alpha-olefin copolymer having a melting point of 130° to 160° C.,
(c) a propylene polymer having a melting point at least 10° C. higher than the melting point of the propylene/alpha-olefin copolymer, and
(d) a blowing agent, and optionally
(e) a crosslinking agent and/or a crosslinking promoting agent; and
a process for producing an olefinic resin foam comprising crosslinking and heat-foaming the aforesaid heat-foamable olefinic resin composition.

22 Claims, No Drawings

HEAT-FOAMABLE OLEFINIC RESIN COMPOSITION AND PROCESS FOR PRODUCTION OF OLEFINIC RESIN FOAM FROM SAID COMPOSITION

This invention relates to a novel heat-foamable olefinic resin composition and to a process for producing an olefinic resin foam containing uniform and fine closed cells and having excellent thermal stability by crosslinking and heat-foaming the aforesaid composition.

A polypropylene foam, the same species as a polyethylene foam, is a rigid foam having higher thermal stability and mechanical strength characteristics such as tensile strength or flexural strength than the polyethylene foam, and higher thermal stability and flexural strength than a polystyrene foam, another typical rigid foam, and is expected to gain widespread acceptance as a thermal-insulator, packaging and building materials. On the other hand, the polypropylene foam has the defect of being brittle at low temperatures below room temperature.

When ordinary crystalline polypropylene is heated above its melting point, its melt viscosity abruptly decreases and the polymer cannot fully includes a gas generated from a blowing agent. It is the practice therefore to crosslink the resin moderately in a conventional process for producing polypropylene foams of high expansion ratios.

In the production of resin foams having uniform fine cells, it is generally important to mix the resin fully with the blowing agent and additives such as a crosslinking agent. In the conventional process for producing a polypropylene foam, the polypropylene used as a material has a high melting point which is close to the decomposition temperature of a blowing agent such as an azide compound or a crosslinking agent such as an organic peroxide. Unlike the production of a polyethylene foam, therefore, the blowing agent or the crosslinking agent undergoes decomposition during the melt-mixing of the resin with the blowing agent or the crosslinking agent or during the molding of a foamable composition to cause partial crosslinking or foaming of the resin. For this reason, a foam having uniform fine cells or a uniform crosslinkage is difficult to obtain.

To inhibit the heat-decomposition of the blowing agent or the crosslinking agent and the partial crosslinking or foaming of the resin, it is necessary, for example in the case of heat molding by an extruder, to suppress heat generation by reducing the rotating speed of the screw. Hence, the productivity decreases, and the cost of production increases.

In an attempt to avoid such problems with the manufacturing process, there have been proposed some techniques including the use of a propylene copolymer having a relatively low melting point such as an ethylene/propylene random copolymer as a base material (see, for example, U.S. Pat. No. 3,062,729, British Patent No. 965,030, Japanese Patent Publication No. 38716/1971 and Japanese Laid-Open Patent Publication No. 34732/1981).

However, a foamed product produced from an ethylene/propylene random copolymer having such a low melting point naturally has poor thermal stability and low mechanical strength characteristics such as tensile strength and flexural strength, resulting in a loss of the inherent properties of the polypropylene foam.

The present inventors have extensively worked in order to develop a process for producing an olefinic resin foam having uniform fine closed cells and being free from the aforesaid defects at a low cost without a deterioration in the excellent properties of the polypropylene foam. This work has led to the discovery that when an olefinic resin composition having a formulation mentioned below is used, the heat decomposition of the blowing agent or crosslinking agent does not occur during melt-mixing or molding, and an olefinic resin foam containing uniform fine cells and having excellent thermal stability and a high expansion ratio can be obtained at a low cost.

It is an object of this invention therefore to provide a heat-foamable olefinic resin composition capable of giving an olefinic resin foam containing uniform and fine closed cells and having excellent thermal stability and mechanical properties, and a process for producing the aforesaid olefinic resin foam from this foamable resin composition.

According to this invention, there is provided a heat-foamable olefinic resin composition comprising
(a) an ethylenic polymer,
(b) a propylene/alpha-olefin copolymer having a melting point of 130° to 160° C.,
(c) a propylene polymer having a melting point at least 10° C. higher than the melting point of the propylene/alpha-olefin copolymer, and
(d) a blowing agent, and optionally
(e) a crosslinking agent and/or a crosslinking promoting agent.

By crosslinking and heat-foaming the aforesaid olefinic resin composition in accordance with this invention, an olefinic resin foam containing uniform fine closed cells and having excellent thermal stability and mechanical properties can be produced.

A detailed description of the composition and the process of this invention follows.

The "ethylenic polymer" used in the heat-foamable olefinic resin composition (to be sometimes referred to hereinafter as a "foamable composition") denotes both an ethylene homopolymer and a copolymer derived from ethylene as a major component and at least one other ethylenically unsaturated monomer. The copolymer comprising ethylene as a major component contains at least 50% by weight, preferably at least 80% by weight, more preferably 90 to 99% by weight, of ethylene. Examples of the ethylenically unsaturated monomer to be copolymerized with ethylene include alpha-olefins such as propylene and butene, and vinyl acetate. They may be used either singly or in combination for copolymerization with ethylene.

Illustrative of the ethylenic polymer (a) that can be used in this invention are low-density polyethylene, medium-density polyethylene, high-density polyethylene, low-density linear polyethylene, ethylene/vinyl acetate copolymer, and amorphous ethylene/propylene copolymer. They may be used either singly or in combination. Desirably, these ethylenic polymers have a melt index in the range of generally 0.1 to 50, preferably 0.2 to 30, and more preferably 0.5 to 20.

The "melt index", as used in the present specification and appended claims, is measured by the method described in ASTM D1238.

When a flexible olefinic resin foam is desired in this invention, low-density polyethylene, low-density linear polyethylene, ethylene/vinyl acetate copolymer and amorphous ethylene/propylene copolymer are used singly or in combination as the ethylenic polymer (a). When it is desired to obtain an olefinic resin foam having a high elongation at room temperature, low-density polyethylene and ethylene/vinyl acetate copolymer are used singly or in combination. If a rigid foam is desired, medium-density polyethylene and high-density polyethylene are used singly or in combination.

The suitable amount of the ethylenic polymer (a) is 10 to 80% by weight, preferably 20 to 60% by weight, more preferably 30 to 50% by weight, based on the foamable composition. If it is less than 10% by weight, a low molding temperature is difficult to maintain during heat-molding in an extruder or the like. Consequently, the blowing agent or the crosslinking agent decomposes and a molded product of good quality is difficult to obtain. If, on the other hand, it exceeds 80% by weight, the amounts of the propylene/alpha-olefin copolymer (b) and the propylene polymer (c) in the composition become relatively small. Heat molding in an extruder or the like consequently becomes easy, but since such properties as thermal stability and mechanical strength are reduced, the resulting product cannot satisfactorily exhibit the inherent properties of the polypropylene foam.

The propylene/alpha-olefin copolymer (b) used in the present invention is a propylene copolymer having a relatively low melting point, i.e. 130° to 160° C., preferably 135° to 155° C.

The melting points of the polymers or copolymers, as referred to in the present specification and the appended claims, denote peak temperatures of differential thermograms determined by a differential thermal analysis device or a differential scanning thermal analysis device.

Since the propylene/alpha-olefin copolymer (b) has a relativley low melting point, it does not contribute to the heat resistance of the olefinic resin foam, but serves to improve its tensile strength and vacuum-formability.

The propylene/alpha-olefin copolymer (b) generally contains 80 to 99% by weight, preferably 85 to 99% by weight, of propylene. The alpha-olefin to be copolymerized with it may be an alpha-olefin having 2 to 8 carbon atoms, especially 2 to 6 carbon atoms, such as ethylene, butene-1, 4-methylpentene-1, and octene-1. They may be used either singly or in combination. Specific examples of the propylene/alpha-olefin are ethylene/propylene random copolymer and ethylene/butene-1/propylene copolymer, which have a melting point within the range of 130° to 160° C. Desirably, these propylene/alpha-olefin copolymers (b) generally have a melt index of 0.1 to 50, preferably 0.3 to 30 and more preferably 0.5 to 20.

The suitable amount of the propylene/alpha-olefin copolymer (b) is 10 to 80% by weight, preferably 20 to 60% by weight, more preferably 30 to 70% by weight. If it is less than 10% by weight, the amount of the ethylenic polymer (a) increases. Consequently, the heat molding of the foamable composition in an extruder or the like becomes easy, but since the thermal stability, mechanical strength and other properties of the resulting resin foam are deteriorated, it is difficult to obtain the required inherent properties of the polypropylene foam. If the amount of the propylene/alpha-olefin copolymer (b) is more than 80% by weight, the amount of the ethylenic polymer (a) is relatively small, and the heat-molding of the foamable composition becomes difficult. Consequently, the decomposition of the blowing agent and crosslinking agent occurs during heat molding, and a foamed product having good quality cannot be obtained.

The "propylene polymer" (c) used in the foamable composition of this invention denotes both a propylene homopolymer and a copolymer derived from propylene as a major component and at least one other ethylenically unsaturated monomer. The copolymer comprising propylene as a major component contains at least 50% by weight, preferably at least 70% by weight, more preferably 90 to 99% by weight, of propylene. Examples of the ethylenically unsaturated monomer to be copolymerized with propylene are ethylene, butene-1 and 4-methylpentene-1. Specific examples of the propylene copolymer (c) include ethylene/propylene block copolymer, ethylene/propylene random copolymer, ethylene/butene/propylene block copolymer, and ethylene/butene/propylene random copolymer.

The propylene polymer (c) is a component used for increasing the thermal stability of the olefinic resin foam. Accordingly, the propylene polymer (c) should have a melting point at least 10° C., preferably 10° to 40° C., higher than the propylene/alpha-olefin copolymer (b). The propylene polymer (c) having a higher melting point includes polypropylene (propylene homopolymer) and propylene/alpha-olefin copolymers having a lower alpha-olefin content than the propylene/alpha-olefinc copolymer (b).

Desirably, the propylene polymer generally has a melt index in the range of 0.1 to 50, preferably 0.3 to 30, more preferably 0.5 to 20.

Preferably, the propylene polymer (c) is present in an amount of 5 to 40% by weight in the foamable composition. If its amount is less than 5% by weight, the thermal stability of the resulting olefinic resin foam is not so much improved. If, on the other hand, it exceeds 40% by weight, the amount of the ethylenic polymer (a) or the propylene/alpha-olefin copolymer (b) becomes relatively small, and the foamable resin composition is difficult to heat-mold in an extruder or the like. Consequently, the decomposition of the blowing agent and the crosslinking agent occurs during heat molding to make it difficult to obtain a molded article of good qualilty. Conveniently, the amount of the propylene polymer (c) is 10 to 40% by weight, preferably 15 to 35% by weight, in the foamable composition.

Preferably, the propylene polymer (c) is used in an amount of generally 20 to 200 parts by weight, preferably 40 to 170 parts by weight, more preferably 50 to 140 parts by weight, per 100 parts by weight of the propylene/alpha-olefin copolymer (b).

The blowing agent (d) used in this invention may be any compound which is liquid or solid at room temperature, is decomposed to release gas or gasified when heated above the melting temperature of the mixture of the three polymer components (a), (b) and (c), and does not substantially hamper sheet-formation or crosslinking of the foamable composition. Generally preferred are heat-decomposable blowing agents having a decomposition temperature in the range of 180° to 270° C., preferably 180° to 250° C. Specific examples include azodicarbonamide, azodicarboxylic acid metal salts, dinitropentamethylenetetramine, hydrazodicarbonamide, p-toluenesulfonylsemicarbazide and s-trihydrazinotriazine. The blowing agent is used in an amount of generally 0.1 to 40% by weight, preferably 0.5 to 30% by weight, more preferably 1 to 25% by weight, based on the total weight of the polymer components (a), (b) and (c). The amount of the blowing agent can be varied depending upon its kind or the desired expansion ratio. In the present invention, it is generally desirable to use an amount of the blowing agent which is sufficient to give a foam having an expansion ratio of from 3 to 50, preferably from 5 to 40.

In the process for producing the olefinic resin foam of this invention, the crosslinking reaction can be carried out by using a crosslinking agent or by applying ionizing radiation. Desirably, the crosslinking agent for this purpose is an organic peroxide that has a higher boiling point than the temperature at which the mixture of the three polymer components (a), (b) and (c) used in this invention begins to flow. When its decomposition half life is just 1 minute, its decomposition temperature is desirably at least about 120° C., preferably at least 150° C.

Specific examples of the crosslinking agent include methyl ethyl ketone peroxide (182° C.), t-butyl peroxy diisopropyl carbonate (153° C.), dicumyl peroxide (171° C.), cumene hydroperoxide (255° C.), 2,5-dimethyl-2,5-di(t-butylperoxy)hexane (179° C.), 2,5-dimethyl-2,5-dimethyl-2,5-di(t-butylperoxy)hexyne-3 (193° C.), and di-t-butyl peroxy phthalate (159° C.) (the parenthesized figures show decomposition temperatures when the decomposition half life is just 1 minute). The suitable amount of the crosslinking agent is 0.01 to 10% by weight, preferably 0.05 to 5% by weight, based on the total weight of the three polymer components (a), (b) and (c).

In order to carry out smoothly and efficiently the crosslinking reaction of the heat-foamble olefinic resin composition containing the crosslinking agent or the crosslinking of the heat-foamble olefinic resin composition by application of ionizing radiation, it is preferred to incorporate a crosslinking promoting agent in the foamable composition. The crosslinking promoting agent that can be used in this invention may, for example, be an acrylate or methacrylate of an aliphatic polyhydric alcohol having at least 3 acryloyloxy or methacryloyloxy groups in the molecule. Specific examples include trimethylolpropane triacrylate, trimethylolpropane trimethacrylate, trimethylolethane acrylate, teteramethylolmethane triacrylate, tetramethylolmethane triacrylate and tetramethylolmethane tetraacrylate. The amount of the crosslinking promoting agent is not critical. Its suitable amount is generally 0.1 to 10% by weight, preferably 0.5 to 5% by weight, based on the total weight of the three polymer components (a), (b) and (c).

As required, the heat-foamable polyolefinic resin composition provided by this invention may further contain organic or inorganic additives such as polymerizable monomers, heat stabilizers, antioxidants, extenders, plasticizers, flame retardants, and coloring agents unless they substantially hamper crosslinking and foaming.

The foamable composition of this invention is prepared by mixing the aforesaid ethylenic polymer (a), propylene/alpha-olefin copolymer (b), propylene polymer (c) and blowing agent (d) and optionally the crosslinking agent and/or the crosslinking promoting agent (e) and other additives. The mixing can be effected by methods known per se. They include, for example, mixing by a Henschel mixer; mixing by a Banbury mixer; mixing by a mixing roll; mixing by a kneading extruder; and dipping of a mixture of the three polymer components (a), (b) and (c) in a solution of the blowing agent and optionally the crosslinking agent and/or the crosslinking promoting agent. These methods may be used singly or in combination. When the polymer components are powdery, mixing by the Henschel mixer is convenient. This powder mixing is usually carried out at a temperature ranging from room temperature to the softening temperature of the resin. Melt mixing is carried out usually at a temperature ranging from the melting temperature of the mixture of the three polymer components (a), (b) and (c) to 195° C. In the production of a continuous sheet-like foam, the foamable composition is preferably pre-molded into a sheet form by melt-kneading and extrusion at a temperature below the decomposition temperature of the blowing agent.

Crosslinking and foaming of the foamable composition uniformly mixed or kneaded and molded can be carried out at a temperature of 130° to 300° C., preferably 150° to 260° C., under atmospheric or elevated pressure, when the foamable composition contains the crosslinking agent. When the crosslinking agent and the blowing agent decompose almost simultaneously when heated, there is used a method which comprises heating the foamable composition for a time required for crosslinking and foaming in a mold capable of being pressurized and hermetically sealed, and foaming it simultaneously with the releasing of the pressure. This method is very effective when the powdery mixture is directly foamed. When the blowing agent does not decompose under the heat-crosslinking conditions, a method is used which comprises first crosslinking the foamable composition and then heating it under atmospheric or elevated pressure at a temperature above the decomposition temperature of the blowing agent. Foaming under elevated pressures is preferred in order to obtain a foam containing fine cells. The heating time required for crosslinking or foaming varies depending upon the chemical composition of the foamable composition, the shape or size of the foamable composition, etc., but a period of 1 to 30 minutes usually suffices.

When the foamable composition is to be crosslinked by irradiation of ionizing radiation, the ionizing radiation may preferably be an electron beam from an electron beam accelerator, and alpha-, beta- and gamma-rays from $Co^{60}$ and other radioactive isotopes. X-ray and ultraviolet ray may also be used. The dosage of the ionizing radiation differs depending upon the kind of the crosslinking promoting agent, the desired degree of crosslinking, etc., and is generally 0.1 to 30 megarads, preferably 0.5 to 20 megarads.

Foaming of the radiation-crosslinked composition can be effected by heating the composition to a temperature above the melting temperature of the mixture of the three polymer components (a), (b) and (c), preferably above 190° C. The heating may be carried out at atmospheric, elevated or reduced pressure. Any desired heating source or medium for the heating can be used according to the shape and size of the foamable composition and the pressure condition during foaming.

Whichever method of crosslinking and foaming may be employed, the suitable degree of crosslinking is generally 5 to 90%, preferably 20 to 80%. If the degree of crosslinking is less than 5%, it is difficult to obtain a foam containing uniform and fine cells or closed cells. If it exceeds 90%, the crosslinking becomes excessive. Consequently, the crosslinked polymer composition has too high a melting viscosity, and it is difficult to obtain a good foam having a high expansion ratio or to heat-mold the foam.

The term "degree of crosslinking", as used in the present specification and the appended claims, denotes the weight percent of an insoluble portion of the crosslinked product when determined after about 50 mg of a sample of the crosslinked product is immersed in 25 ml of xylene at 120° C. for 24 hours.

The resin foam so produced may generally have an expansion ratio of 3 to 50, preferably 5 to 40, although it varies depending upon its end use.

If desired, a sheet of a non-foamed propylene polymer may be laminated to at least one surface of the resulting sheet-like resin foam. The sheet of the non-foamed propylene polymer is a substantilly non-foamed sheet of polypropylene or a copolymer of a major proportion of propylene with another monomer. The copolymer may be a propylene/alpha-olefin copolymer such as ethylene/propylene block copolymer, ethylene/propylene random copolymer and ethylene/butene/propylene copolymer. The thickness of this sheet is not particularly restricted, but is preferably 0.1 to 1 mm because small thicknesses reduce mechanical strength and large thicknesses make the sheet heavy.

Amination may be effected by any known method. For example, the sheet may be bonded to the resin foam sheet by heat or an adhesive; or it is laminated to the resin foam sheet at the time of melt-extruding a non-foamed propylene polymer into sheet form.

Because the olefinic resin foam provided by this invention has higher thermal stability and mechanical strength characteristics such as tensile strength and flexural strength, it is useful as insulating, packaging and building materials especially where thermal stability and mechanical strength are required.

The following examples illustrate the present invention further. All parts in the examples are by weight.

EXAMPLE 1

Fifty parts of low-density polyethylene having a density of 0.922 and a melt index of 4.0, 35 parts of ethylene/propylene random copolymer having a density of 0.89, a melt index of 7.0 and a melting point of 145° C. and 15 parts of ethylene/propylene block copolymer having a density of 0.90, a melt index of 5.0 and a melting point of 165° C. were mixed with 15 parts of azodicarbonamide, 3.0 parts of trimethylolpropane trimethacrylate and 0.5 part of an antioxidant (IRGANOX 1010, a product of Ciba-Geigy) in a Henschel mixer. The mixture was extruded into a sheet having a thickness of 1.5 mm by an extruder with a screw diameter of 65 mm. The sheet had a smooth surface. During the extrusion, the barrel temperature was maintained at 165° C., and the rotating speed of the screw, at 50 rpm.

Electron beams in a dosage of 2.0 megarads were applied to both surfaces of the sheet by an electron beam accelerator, and the sheet was then heat-foamed in a Geer's oven at 250° C.

The foamed sheet had a thickness of 3.5 mm and an apparent density of 0.030 g/cm$^3$. The cells were uniform and fine. It had a gel fraction of 53%. To determine a measure of the heat resistance of this foamed sheet, it was heated in a Geer's oven at 140° C. for 1 hour. The volume retention of the foamed sheet after this test was found to be 89.4%.

EXAMPLE 2

Forty parts of high-density polyethylene having a density of 0.955 and a melt index of 6.0, 40 parts of ethylene/butene/propylene copolymer having a density of 0.90, a melt index of 8.0 and a melting point of 142° C. and 20 parts of ethylene/propylene block copolymer having a density of 0.90, a melt index of 5.0 and a melting point of 165° C. were mixed with 10 parts of azodicarbonamide, 0.8 parts of dicumyl peroxide as a crosslinking agent, 3.0 parts of trimethylolpropane trimethacrylate and 0.5 part of an antioxiant (IRGANOX 1010), and the mixture was extruded, in the same way as in Example 1. The resulting sheet had a smooth surface.

The sheet was heated at 170° C. for 10 minutes, and then foamed in a Geer's oven at 250° C. The foamed sheet had a thickness of 3.0 mm, an apparent density of 0.048 g/cm$^3$, and a gel fraction of 56%. The cells of the sheet were fine.

COMPARATIVE EXAMPLE 1

One hundred parts of ethylene/propylene block copolymer having a density of 0.90, a melt index of 5.0 and a melting point of 165° C., 15 parts of azodicarbonamide, 3.0 parts of trimethylolpropane trimethacrylate and 0.5 part of an antioxidant (IRGANOX 1010) were mixed and molded in the same way as in Example 1. The blowing agent was decomposed in the extruder, and the extruded sheet had a rough surface with many voids therein. When this sheet was crosslinked and foamed in the same way as in Example 1, its surface became very much roughened.

COMPARATIVE EXAMPLE 2

One hundred parts by weight of ethylene/propylene block copolymer having a density of 0.90, a melt index of 5.0 and a melting point of 165° C., 10 parts of azodicarbonamide, 0.8 part of dicumyl peroxide, 3.0 parts of polymethylolpropane trimethacrylate and 0.5 part of an antioxidant (IRGANOX 1010) were mixed and extruded in the same way as in Example 2. Crosslinking proceeded within the extruder, and the blowing agent was decomposed. A sheetlike article could not be obtained.

COMPARATIVE EXAMPLE 3

One hundred parts of ethylene/propylene random copolymer having a density of 0.89, a melt index of 7.0 and a melting point of 145° C., 15 parts of azodicarbonamide, 3.0 parts of polymethylolpropane trimethacrylate and 0.5 part of an antioxidant (IRGANOX 1010) mixed, extruded, crosslinked and foamed in the same way as in Example 1. The resulting foamed sheet had an apparent density of 0.033 and contained uniform fine closed cells.

When the heat resistance of this foamed sheet was examined in the same way as in Example 1, its volume retention was found to be 64.2%.

EXAMPLE 3

A 0.3 mm thick sheet of an ethylene/propylene block copolymer having a density of 0.91 was heat-laminated to both surfaces of the foamed sheet obtained in Example 1. The laminated sheet obtained had a weight of 651 g/m$^2$, and excellent heat resistance, moldability, low-temperature impact strength and elasticity.

EXAMPLE 4

A 0.2 mm thick sheet of an ethylene/propylene block copolymer having a density of 0.91 was heat-laminated to both surfaces of the foamed sheet obtained in Example 2. The laminated sheet obtained had a weight of 508 g/m² and excellent heat resistance, heat moldability, elasticity and low-temperature impact strength.

The above examples demonstrate that by using the aforesaid combination of the ethylenic polymer, the propylene/alpha-olefin copolymer and the propylene polymer as a material, an olefinic resin foam having a high expansion ratio and containing uniform and fine cells can be produced at a low cost.

Since the present invention permits kneading and molding at lower temperatures than in the case of using crystalline polypropylene or a propylene/ethylene block copolymer in the conventional processes for producing polypropylene foams, foams having more uniform cells or crosslinkage than foams obtained by the prior art can be easily produced at a low cost.

In addition, foams obtained by using the foamable composition of this invention have higher heat resistance than those obtained by using only a low-melting propylene copolymer such as ethylene/propylene random copolymer.

Accordingly, the process for producing an olefinic resin foam in accordance with this invention is much easier in the operation of kneading or molding the foamable composition than the conventional processes, and can give sheet-like or block-like foams having excellent quality. It is therefore very advantageous for industrial practice.

The laminated sheets produced in Examples 3 and 4 above are light in weight and had excellent impact strength, thermal stability, rigidity, strength, soundproofness, sound absorbability and bending resistance. They can be easily heat-molded with a beautiful finish, and can be used suitably as core materials for interior finishing of vehicles and for house units.

What is claimed is:

1. A heat-foamable olefinic resin composition comprising
   (a) an ethylene polymer selected from the group consisting of polyethylene and a copolymer derived from ethylene as a major component and at least one other ethylenically unsaturated monomer,
   (b) a propylene/alpha-olefin copolymer having a melting point of 130° to 160° C.,
   (c) a propylene polymer selected from the group consisting of polypropylene and a copolymer derived from propylene as the major component and at least one other ethylenically unsaturated monomer, having a melting point at least 10° C. higher than the melting point of the propylene/alpha-olefin copolymer, and
   (d) a blowing agent, and optionally
   (e) a crosslinking agent and/or a crosslinking promoting agent.

2. The composition of claim 1 wherein the ethylenic polymer (a) is selected from the group consisting of low-density polyethylene, medium-density polyethylene, high-density polyethylene, linear low-density polyethylene, ethylene/vinyl acetate copolymer and amorphous ethylene/propylene copolymer.

3. The composition of claim 1 wherein the ethylenic polymer (a) has a melt index in the range of 0.1 to 50.

4. The composition of claim 1 wherein the proportion of the ethylenic polymer (a) is 10 to 80% by weight based on the weight of the composition.

5. The composition of claim 1 wherein the propylene/alpha-olefin copolymer (b) is selected from ethylene/propylene random copolymer and ethylene/butene-1/propylene random copolymer.

6. The composition of claim 1 wherein the propylene/alpha-olefin copolymer (b) has a melt index of 0.1 to 50.

7. The composition of claim 1 wherein the proportion of the propylene/alpha-olefin copolymer (b) is 10 to 80% by weight based on the weight of the composition.

8. The composition of claim 1 wherein the propylene polymer (c) is selected from the group consisting of polypropylene, ethylene/propylene block copolymer, ethylene/propylene random copolymer, ethylene/butene/propylene random copolymer and ethylene/butene/propylene block copolymer.

9. The composition of claim 1 wherein the propylene polymer (c) has a melt index of 0.1 to 50.

10. The composition of claim 1 wherein the amount of the propylene polymer (c) is 5 to 40% by weight based on the weight of the composition.

11. The composition of claim 1 wherein the amount of the propylene polymer (c) is 20 to 200 parts per 100 parts by weight of the propylene/alpha-olefin copolymer (b).

12. The composition of claim 1 wherein the blowing agent (d) is a heat-decomposable blowing agent having a decomposition temperature of 180° to 270° C.

13. The composition of claim 1 wherein the amount of the blowing agent (d) is 0.1 to 40% by weight based on the total weight of the polymers (a), (b) and (c).

14. The composition of claim 1 which contains the crosslinking agent.

15. The composition of claim 14 wherein the crosslinking agent has a decomposition temperature of at least 120° C. when its decomposition half life is just 1 minute.

16. The composition of claim 1 wherein the amount of the crosslinking agent is 0.01 to 10% by weight based on the total weight of the polymers (a), (b) and (c).

17. The composition of claim 1 wherein the amount of the crosslinking promoting agent is 0.1 to 10% by weight based on the weight of the polymers (a), (b) and (c).

18. A process for producing an olefinic resin foam, which comprises crosslinking and heat-foaming the heat-foamable olefinic resin composition of claim 1.

19. The process of claim 18 wherein the resin composition containing the crosslinking agent is heated to 130° to 300° C. crosslink it.

20. The process of claim 18 wherein the crosslinking of the composition is effected by applying ionizing radiation.

21. The process of claim 19 wherein the crosslinking is effected until the degree of crosslinkage reaches 5 to 90%.

22. The process of claim 18 wherein the foam has an expansion ratio of from 3 to 50.

* * * * *